April 9, 1940.　　　　　J. REEH　　　　　2,196,643
PLANT FOR FREEZING AND STORING FISH ON SHIPS
Filed Jan. 13, 1938　　　3 Sheets-Sheet 3
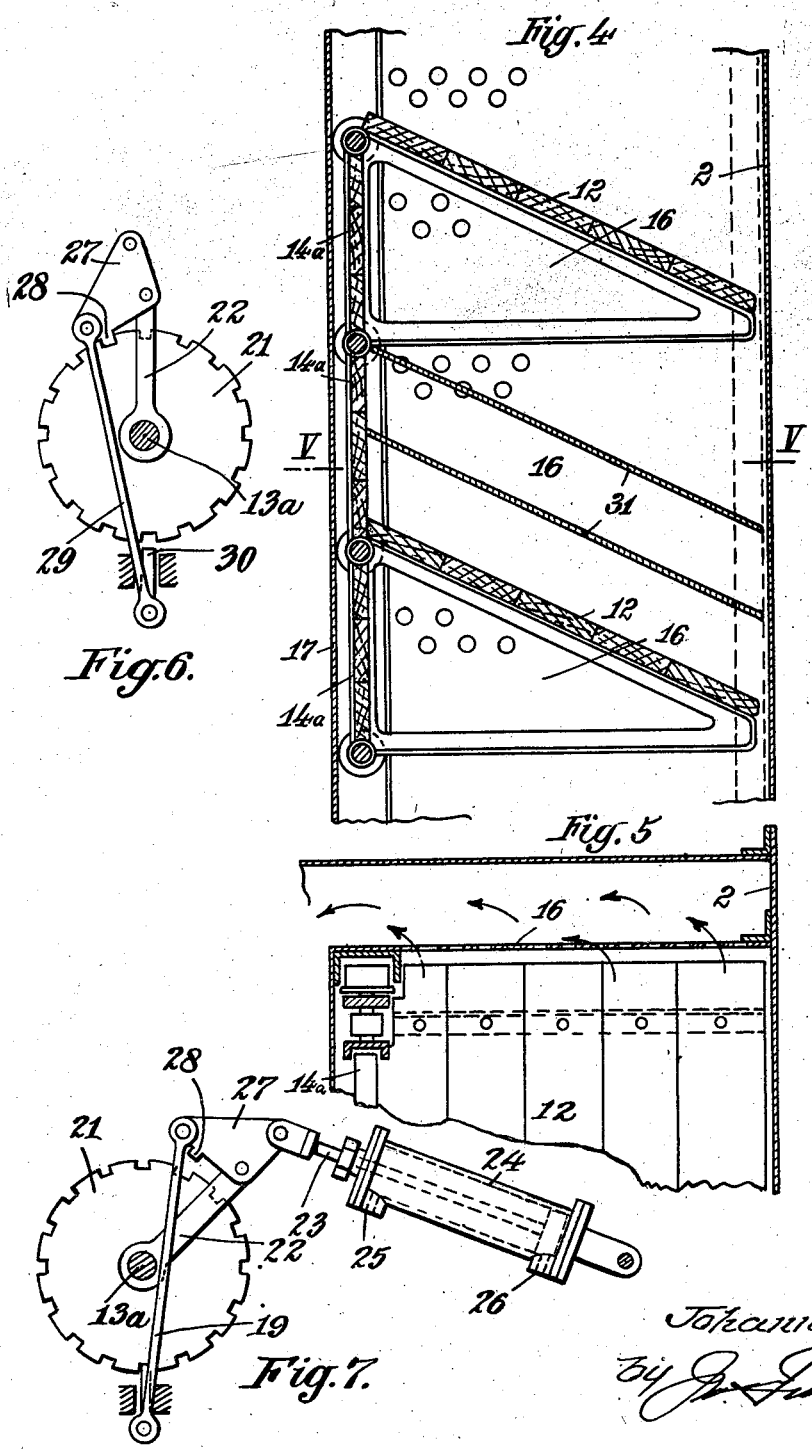

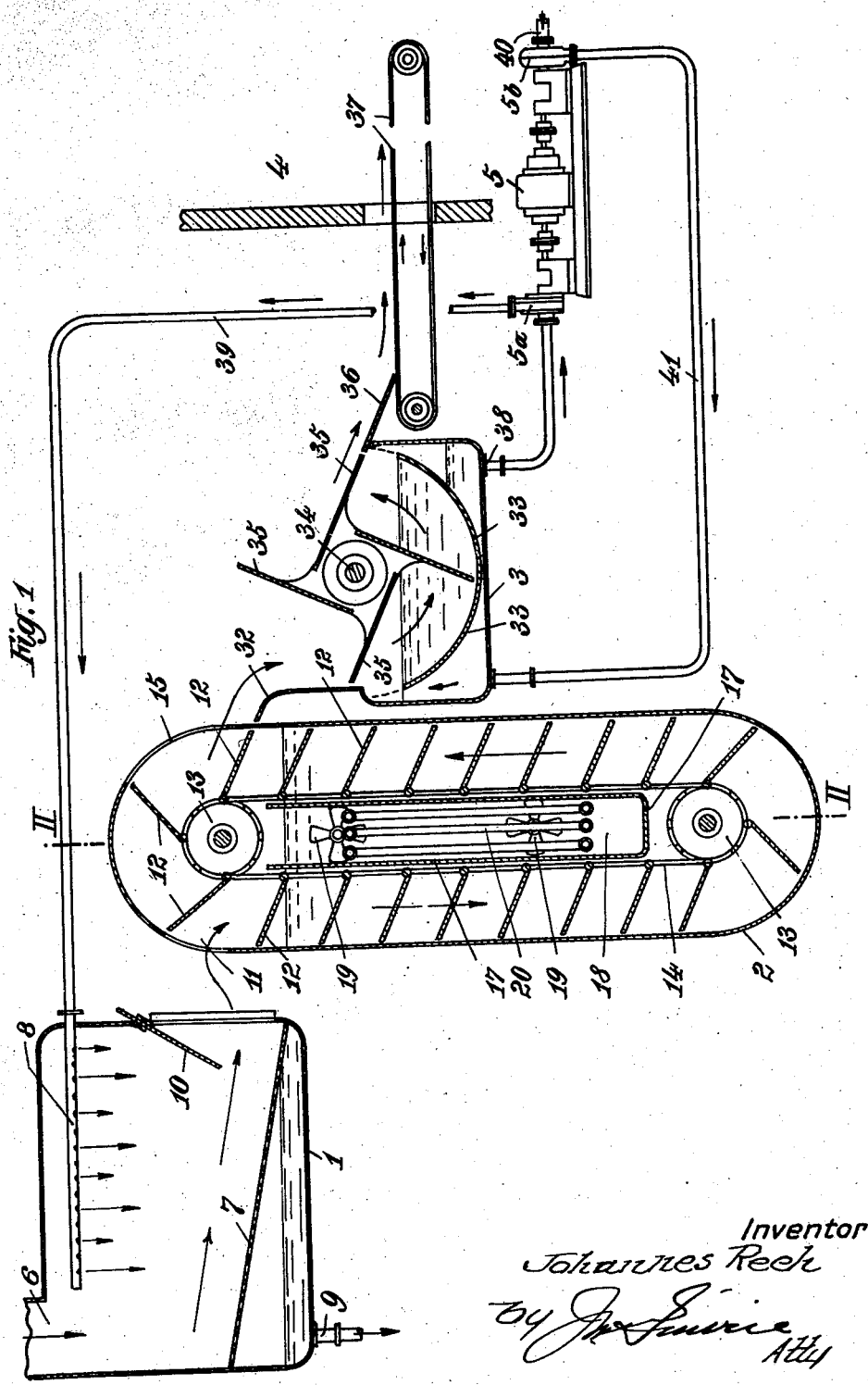

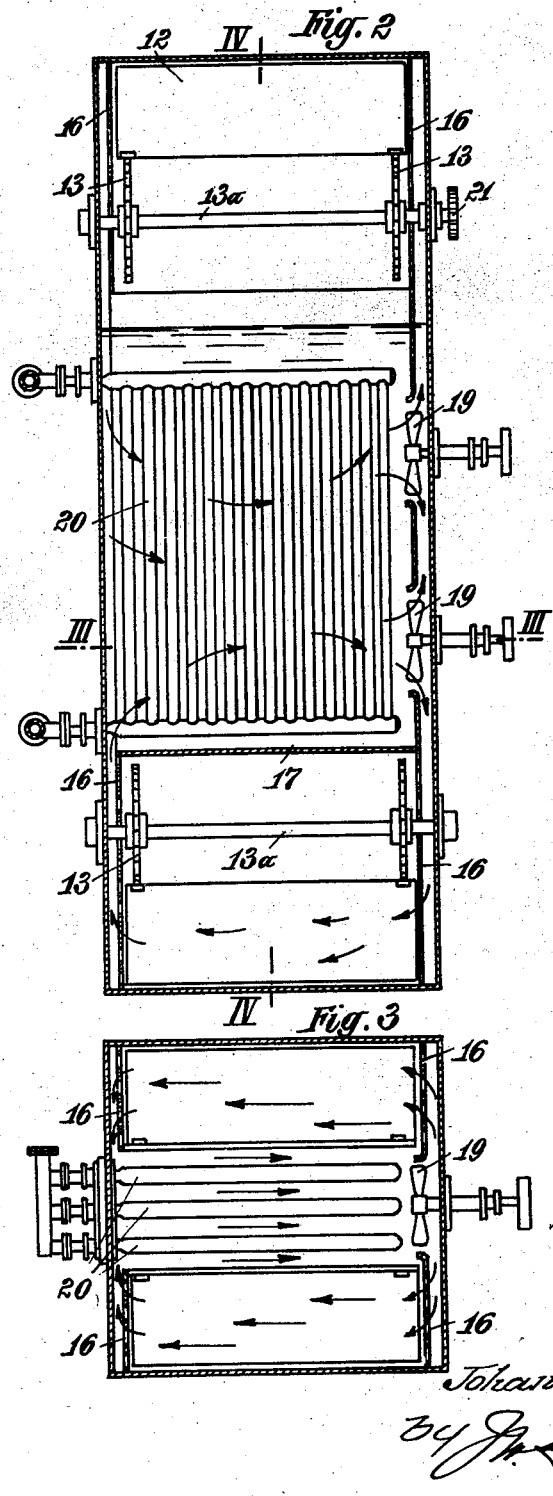

Patented Apr. 9, 1940

2,196,643

UNITED STATES PATENT OFFICE 2,196,643

PLANT FOR FREEZING AND STORING FISH ON SHIPS

Johannes Reeh, Chatenay-Malabry, France

Application January 13, 1938, Serial No. 184,884
In Germany January 15, 1937

4 Claims. (Cl. 62—1)

The invention relates to a plant for freezing and storing fish on ships and it consists essentially in the connecting in series of a pre-cooler vessel, of one or several vessels of greater height than width, into which the fish are conducted through freezing solutions by means of distributing plates fixed on an endless band or chain, of a washing vessel fed with sea-water, in which the surface of the fish is freed from salt, and whose cooled washing water is fed to the pre-cooling vessel for pre-cooling the fish, and of a conveyor band extending from the washing vessel and by which the fish are conveyed into a store room adapted to be cooled to a low temperature.

It is known that fish absorb salt at least on their outer surface, when they are brought for freezing directly into a freezing brine. In order to avoid this, the fish when caught are, according to the invention, pre-cooled in the outer layers to slightly below 0° C. in a pre-cooler by spraying or by indirect cooling, so that the fish can then no longer absorb in the freezing vessel any salt from the freezing brine. The salts adhering to the surface are then washed off in a washing vessel, the washing water which is cooled by the fish cooled to a low temperature, is fed by a pump arrangement for spraying in the pre-cooler.

According to the invention the freezing vessels consist of vertical vessels for holding the brine, and in which an endless conveyor means, such as a conveyor belt, conveyor chain or the like, runs over two or more reversing elements, dividing plates being fixed on the chain or belt and form together with the rigid inner, outer and side walls conveying chambers for the fish to be conducted through the brine. Owing to this construction the freezing device can be accommodated on the smallest possible floor space and the individual conveying chambers travel over a long stretch in the brine so that, on the one hand, a uniform freezing through is attained on account of the large number of chambers and, on the other hand, a great efficiency is obtained owing to the path available in the cooling brine.

An embodiment of the invention is illustrated by way of example in the accompanying drawings, in which:

Fig. 1 is a diagrammatic section through the plant,

Fig. 2 is a vertical section through the freezing vessel taken on line II—II of Fig. 1, Fig. 3 is a cross-section on line III—III of Fig. 2, Fig. 4 shows on a larger scale a section on line IV—IV of Fig. 2, Fig. 5 is a part section on line V—V of Fig. 4, Figs. 6 and 7 show the control gear for the freezing device in side elevation.

The plant comprises according to the invention a pre-cooler 1, one or several freezing devices 2 adapted to be cooled to a low temperature and containing salt solutions of similar or dissimilar concentration or even dissimilar solutions, a device 3 for washing the frozen fish, a store room 4 designed to be cooled to a low temperature and a pump aggregate 5 by which the washing liquid, preferably sea-water, cooled by the frozen fish is supplied to the pre-cooler 1.

The pre-cooler 1 has an aperture 6 for pouring in the caught fish and comprises a perforated plate 7 on which the fish drop and which is inclined towards the freezing device 2. The fish in the vessel 1 are cooled to freezing point by being washed with washing liquid brought to a low temperature during the washing in the vessel 3 by spraying by means of sprinkler pipes 8 or by immersion in the liquid, additional mechanical cold being also utilised. The pre-cooling may, however, be carried out by cooling the vessel 1 by some other method by the cold brine liquid and by thus bringing the fish to the freezing point by indirect means. When sprinkling according to Fig. 1 the liquid is either merely conducted into the open through the socket 9 or it can be returned to the vessel 3 in circulation.

When the fish have been cooled to a temperature of about 0° C., they are removed from the pre-cooler 1 in batches through a flap 10 or the like by hand or automatically and delivered through an aperture 11 into the freezing cooler 2 operated with salt solutions. This freezing cooler 2 consists of a vessel of greater height than width, in which distributing plates 12 circulate over reversing rollers 13 by means of an endless chain 14 or endless bands or the like. The reversal may, for example, be effected by means of two rollers 13 or also by a greater number of rollers along a triangular or rectangular path. The dividing plates 12 are mounted on the endless chain 14 at a fixed angle which is preferably chosen so that it ascends in outward direction on the inlet side 11 and descends accordingly on the delivery side 18. Thus, the fish fed from the vessel 1 into the freezing cooler 2 are reliably caught and held and, sliding off at the delivering side, they can be delivered into the washing vessel 3.

As shown in Fig. 4 the endless chain 14 is composed of hingedly connected links 14a, which are then conducted over polygonal reversing rollers.

The dividing plates 12 form, together with the outer wall of the vessel 2, the inner walls or parts 14a and the vertical, rigid, perforated side walls 16 (Figs. 3 and 5), a series of chambers which are called conveyor chambers. The dividing plates 12 or the endless chain guided in circulation enclose a space 18 preferably formed by walls 17, the sides of which space in the direction of the reversing shafts 13a are open so that the space 18 communicates through the perforated side walls 16 with the individual conveyor chambers between the plates 12. At one end of the space 18 one or several blade wheels 19 are arranged by which the brine brushing along the cooling coils 20 is conducted in circulation through the space 18 and parallel to the axes of rotation through the conveyor chambers, so that a uniform distribution of cold is attained in the freezing cooler 2 and the fish in the conveyor chambers uniformly absorb the freezing cold (see arrows in Figs. 2 and 3).

One of the reversing rollers 13a, for example the upper one, is the driving shaft. On this driving shaft 13a (Figs. 2, 6 and 7) a toothed wheel 21 is keyed and if necessary connected with a gearing, and on this shaft a lever 22 is oscillatably mounted, the other end of which is connected with the piston rod 23 of the piston of a hingedly suspended oil pump 24 having two control connections 25 and 26. The lever 22 is connected with the piston rod 23 by a link 27 provided with a tooth 28, which, during the outward movement of the piston rod 23, engages one of the gaps in the toothed wheel 21 and rotates this wheel through a predetermined angle, thus moving the dividing plates 12 a corresponding distance, the length of this movement being dependent upon the height of the conveyor chambers and chosen so that, when one conveyor chamber is accessible through the aperture 11 (Fig. 1), the next following chamber can be filled with fish after the feeding motion. Correspondingly on the delivering side one chamber is emptied at each feeding movement. So that the toothed wheel 21 and with the same the conveyor chambers are temporarily held in a predetermined position, a lever 29 is oscillatably mounted at one end on the link 27, the other end of this lever being connected with a radially shiftable pin 30, so that during the retracting movement of the piston rod 23 of the pump 24 the tooth 28 is disengaged from the wheel 21 and the pin 30 engaged in its stead and thus holds the wheel 21 and the dividing plates 12 in a predetermined position until the piston again performs its outward stroke.

Thus, the individual conveyor chambers between the plates 12 are, according to the invention, moved periodically, the total time of passage being sufficient for the fishes in the individual conveyor chambers to be both frozen right through and also cooled to a temperature below freezing. Furthermore, the dividing plates 12 moving through the liquid can be continuously driven, when the time during which they travel through the brine is adapted to the freezing and low cooling procedure.

The object of the individual conveyor chambers or the extensive chamber-like subdivision is, on the one hand, to conduct the fishes floating in the brine through this brine, and on the other hand to bring the fish into a position extending in the direction of the dividing plates 12 so that the circulating brine washes the fish on all sides and thus enables the freezing and cooling below freezing point to be carried out in a freezing vessel 2 of smallest possible dimensions. To maintain the fishes floating in the flowing brine in the direction of flow right up to the reversing points for the conveyor chambers, these chambers are preferably subdivided by additional partitions 31 (Fig. 4). These partition plates 31 may be either loosely inserted parallel to the plates 12 or can also be screwed on the wall parts 14a by hinges or hooks.

When the fish have passed through the freezing vessel they are delivered through an opening 15 into the washing vessel 3 over a chute 32. This vessel 3 accommodates a semicylindrical trough 33 over which a shaft 34 is journalled carrying scraper arms 35 extending tangentially to an imaginary circle. These plate-shaped scraper arms 35, which are interconnected in trough-shape on the admission side for the fish, run through the semi-cylindrical trough 33 filled with sea-water or other washing liquid and thereby carry with them the falling fish so that their surface is freed from any salts taken up in the freezing vessel 2. At the end of the washing vessel 3 the fishes, carried by the arms 35, slide over a chute 36 on to a conveyor band 37 which leads to the store room 4 adapted to be cooled to a low temperature. This conveyor band 37, or another band, can also move through the washing vessel 3 so that transporting devices of the kind described are no longer required. During the passage through the washing vessel cold is imparted to the sea-water by the fish and this cooled water is supplied to the sprinkler pipe 8 of the pre-cooler 1 through connections 38, a pump 5a and a conduit 39. The lost cooling water is replenished either by fresh sea-water through a suction pipe 40, a pump 5b and a conduit 41, or the sea-water used for pre-cooling in the vessel 1 is returned in circulation to the washing vessel 3 through the tubular connections 9. The latter arrangement is chiefly recommended when the rinsing liquids used are artificially produced solutions.

I claim:

1. A refrigerating plant for freezing fish wherein the fish are conducted through brine cooled to a low temperature, including a vertically elongated vessel for containing the brine and having an inlet opening and an outlet opening at opposite sides of the upper part of the vessel, conveyor pulleys within the upper and lower ends of the vessel, endless conveyor means trained around said pulleys and dividing the vessel into a central compartment and lateral compartments communicating at their sides, division plates carried by said conveyor means and passing the vessel openings, said plates being inclined with respect to the conveyor means to slope downward towards the conveyor means when passing the said inlet opening, and means within the central compartment causing circulation of brine through the several compartments.

2. The refrigerating plant of claim 1 characterized by having cooling coils located in said central compartment.

3. The refrigerating plant of claim 1 characterized by having the side walls of the lateral compartments foraminous and spaced from the side walls of the vessel and by having the circulation causing means of propeller-like form.

4. The refrigerating plant of claim 1 characterized by having means for producing a step-by-step movement in the conveyor means, with each step of the step-by-step movement equal to the distance between points of attachment of adjacent division plates to the conveyor means as measured along said conveyor means.

JOHANNES REEH.